United States Patent
Klar et al.

(10) Patent No.: US 9,617,969 B2
(45) Date of Patent: Apr. 11, 2017

(54) HYDRAULIC ENERGY STORE

(75) Inventors: Robert Klar, Ehrwald (AT); Markus Aufleger, Innsbruck (AT)

(73) Assignee: Universität Innsbruck, Innsbruck (AT)

( * ) Notice: Subject to any disclaimer, the term of this patent is extended or adjusted under 35 U.S.C. 154(b) by 346 days.

(21) Appl. No.: 14/002,049

(22) PCT Filed: Feb. 27, 2012

(86) PCT No.: PCT/EP2012/053276
§ 371 (c)(1),
(2), (4) Date: Oct. 15, 2013

(87) PCT Pub. No.: WO2012/116956
PCT Pub. Date: Sep. 7, 2012

(65) Prior Publication Data
US 2014/0033700 A1 Feb. 6, 2014

(30) Foreign Application Priority Data

Feb. 28, 2011 (DE) ........................ 10 2011 012 594

(51) Int. Cl.
F03B 13/06 (2006.01)
F03B 3/10 (2006.01)
F03B 17/02 (2006.01)

(52) U.S. Cl.
CPC .............. F03B 13/06 (2013.01); F03B 3/103 (2013.01); F03B 17/025 (2013.01); Y02E 10/20 (2013.01);
(Continued)

(58) Field of Classification Search
CPC ........ F03B 13/06; F03B 13/264; F03B 13/26; F03B 13/144; F03B 13/147; F03B 13/1865;
(Continued)

(56) References Cited

U.S. PATENT DOCUMENTS 1,507,461 A * 9/1924 Chase ..................... F03B 13/22
405/224
4,141,670 A * 2/1979 Russell ................ F03B 13/145
290/53
(Continued)

FOREIGN PATENT DOCUMENTS

DE 4221657 A 1/1994
DE 19513817 A 10/1996
(Continued)

OTHER PUBLICATIONS

Heindl, E., "Hydraulische Energiespeicher für den Ausbau der erneuerbaren Energien," Sep. 14, 2010, SolarServer, Das Internetportal zur Sonnenenergie.
(Continued)

*Primary Examiner* — Thai Ba Trieu
*Assistant Examiner* — Xiaoting Hu
(74) *Attorney, Agent, or Firm* — Frost Brown Todd LLC

(57) ABSTRACT

The present invention relates to a hydraulic energy store (1) having a first (2) and a second fluid reservoir (6), the fluid levels (4, 12) of which extend at different heights, which are connected to one another via a turbine/pump arrangement (10) and during the operation of which a fluid (3) can be moved to and fro between the first (2) and second fluid reservoir (6) and energy can be converted in the process. The second fluid reservoir (6) is configured as a container which is arranged within the fluid (3) in the first fluid reservoir (2), wherein, during operation, the fluid level (12) in the second fluid reservoir (6) can be changed in such a way that, as a result, the immersion depth ($h_t$) of said second fluid reservoir (6) in the first fluid reservoir (2) can be changed owing to buoyancy.

16 Claims, 6 Drawing Sheets

(52) U.S. Cl.
CPC .............. *Y02E 10/22* (2013.01); *Y02E 10/223* (2013.01); *Y02E 10/38* (2013.01); *Y02E 60/17* (2013.01)

(58) Field of Classification Search
CPC .......... F03B 17/02; F03B 17/025; F03B 3/10; F03B 3/103; F03D 9/02; F03D 9/023; F03D 9/025; F03D 9/026; F03D 9/008; Y02E 60/17
See application file for complete search history.

(56) References Cited

U.S. PATENT DOCUMENTS

| | | | | |
|---|---|---|---|---|
| 4,321,475 | A * | 3/1982 | Grub | F03B 13/06 290/52 |
| 7,564,143 | B1 * | 7/2009 | Weber | F03B 13/06 290/42 |
| 9,051,914 | B1 * | 6/2015 | Hanna | F03B 13/10 |
| 2009/0140523 | A1 * | 6/2009 | DeAngeles | F03B 17/005 290/43 |
| 2010/0133837 | A1 * | 6/2010 | Kjaer | F03D 9/001 290/52 |
| 2010/0133903 | A1 * | 6/2010 | Rufer | F02C 6/16 307/22 |
| 2012/0056430 | A1 * | 3/2012 | Aaltonen | F03B 13/06 290/52 |

FOREIGN PATENT DOCUMENTS

| | | | |
|---|---|---|---|
| DE | 102007013610 A | 9/2008 | |
| DE | 102007017695 A | 10/2008 | |
| DE | 102008006897 A | 10/2009 | |
| DE | 102008020987 A | 11/2009 | |
| DE | 102008040393 A1 * | 1/2010 | .............. F03B 13/06 |
| DE | 202009002341 U1 | 7/2010 | |
| DE | 102009005360 A | 8/2010 | |
| DE | 102010034160 A | 2/2012 | |
| DE | WO 2013163979 A2 * | 11/2013 | .............. F03B 13/10 |
| GB | 1601398 A | 10/1981 | |
| NO | GB 2476404 B * | 11/2011 | .............. F03D 9/025 |

OTHER PUBLICATIONS

International Search Report and Written Opinion dated Jun. 8, 2012 for Application No. PCT/EP2012/053276.

* cited by examiner

HYDRAULIC ENERGY STORE

The present invention relates to a hydraulic energy store having a first and a second fluid reservoir, the fluid levels of which extend at different heights, which are connected to another via a turbine/pump arrangement and during the operation of which a fluid can be moved to and fro between the first and second fluid reservoir and energy can be converted in the process, and the second fluid reservoir is configured as a container which is arranged within the fluid in the first fluid reservoir.

The term fluid level in general denotes the level of fluid in a fluid reservoir and it is not limited to a free, undisturbed fluid surface.

Such an energy store uses the principle of pump storage power plants, which is based on the following hydraulic and energy interrelations:

Water is located in a first (upper) and a second (lower) reservoir. Between the reservoirs, a connecting line extends, in which a turbine/pump arrangement is located. The term turbine/pump arrangement below describes arrangements that comprise one or more pump turbines, or pump(s) and/or turbine(s).

Depending on the direction of flow in the connecting line and depending on the pressure ratios, energy is converted; in particular, potential energy is converted to kinetic energy during the operation of the turbine/pump arrangement as a result of water flowing from the upper reservoir into the lower reservoir (turbine operation), or kinetic energy is converted to potential energy when water is pumped up from the lower reservoir into the upper reservoir (pump operation).

As a rule, the turbine/pump arrangement is coupled here to one or more electrical machines which, during turbine operation, convert kinetic energy to electric energy (generator) or, during pump operation, electrical energy to kinetic energy for driving the turbine/pump arrangement (electrical motor). The electrical energy is delivered to a power grid or received via said power grid.

The storage of electrical energy is becoming increasingly important in compensating for the fluctuations between demand for electricity and electricity production. Supplying current from discontinuously available renewable energies reinforces consumption-caused electricity network fluctuations and it increases the need for the regulation and storage of electrical energy. Storage capacities in the form of pump storage power plants here help temporally decoupling electricity generation from electricity consumption. Thus, electrical power can be placed in intermediate storage in the case of a high power production volume (for example, from renewable energies) and/or in the case of a low volume of consumption at off-peak times, so that it can be fed back into the power grid based on demand.

However, the conventional pump storage power plants and the ring-wall storage power plants whose operation is similar (see DE 10 2009 005 360 A) require a suitable landscape topography and/or considerable interventions on the landscape. The required authorization procedures are therefore often problematic. In addition, the topographic conditions for the construction of such storage power plants in the regions where the highest wind energies are available (North Sea and Baltic Sea) are comparatively poor. Ring-wall storage facilities would require considerable interventions in regions that are in part densely populated (Netherlands, Denmark).

Under some circumstances, the use of abandoned lignite strip mining sections as pump storage facility (see DE 195 13 817) requires the construction of long transmission lines from regions that are exposed to high winds. Two-floor structures with reservoirs arranged on top of each other require large-volume land structures (see DE 10 2007 013 610 A).

The same applies to weight storage power plants in which the energy conversion occurs by raising or lowering large, heavy weights (see DE 20 2009 002 341).

So-called potential energy power plants, in which large masses are raised or lowered hydraulically, are also associated with high technical cost and they too require intervention on the landscape (see DE 10 2007 017 695 A, DE 10 2008 006 897 A, Eduard Heindl: "Hydraulische Energiespeicher für den Ausbau der erneuerbaren Energien").

Thus there is a need for energy storage facilities that should be available particularly in the field of off-shore wind energy installations. For this purpose, in DE 42 21 657 A1, an underwater power plant is proposed, which has a reservoir located under the water surface, from which, during pump operation, water is pumped to the surface or into the surrounding water body, and, during turbine operation, water is supplied from the surface to a turbine which is also arranged under the water level of the water body. Such installations require underwater structures and they are possibly problematic with regard to maintenance and expected repairs.

Therefore, the aim is to produce an improved energy store, particularly for the offshore field.

This aim is achieved by the hydraulic energy store according to Claim 1.

Here, it is provided that the second fluid reservoir is formed as a container floating in the first fluid reservoir, and its fluid level can be changed during operation in such a way that consequently, owing to buoyancy, its immersion depth in the first fluid reservoir can be changed and there is a level difference which can be used for the energy conversion. Here, for storing electrical energy, the second fluid reservoir is emptied or filled during pump operation, and in the process it is raised or lowered in the first fluid reservoir. In the process, the fluid flows through the turbine/pump arrangement which is raised or lowered together with the second fluid reservoir. The pressure difference required for turbine operation is defined here by the level difference between the fluid levels of the two fluid reservoirs.

If the fluid level in the second fluid reservoir is below the fluid level in the first fluid reservoir (Claim 2), the second fluid reservoir is raised owing to the buoyancy which is decreased during the operation, and it delivers potential energy by lowering its mass, while the fluid flows into the second reservoir.

On the other hand, if the buoyancy of the second fluid reservoir is sufficiently high so that the fluid level therein is above the fluid level in the first fluid reservoir, fluid flows out of the second fluid reservoir into the first fluid reservoir and in the process it delivers its potential energy.

As a result of additional loads (ballast), it is possible, in several variants, to increase the usable level difference or immersion depth and thus adapt the output of the provided machines to the demand. In other embodiments, this effect is achieved by pulling devices that pull the second reservoir downward into the fluid of the first fluid reservoir. These pulling devices can be formed, among other possibilities, as resilient elements or as buoyant bodies deflected at the bottom of the first fluid reservoir.

Embodiments exist in which the second fluid reservoir is provided with buoyant bodies in order to maintain the fluid level in the second fluid reservoir above the fluid level in the first fluid reservoir. In this solution, the second fluid reservoir can be unsinkable and thus, even when filled it, can always remain partially above the fluid surface of the first fluid reservoir.

In these embodiments, the energy storage capacity can be increased in that, during the filling of the second fluid reservoir, the inflowing fluid deforms a resilient element against a tension force. As a result, in addition to the increased potential energy of the fluid, deformation energy is stored in the second fluid reservoir, which can then be delivered again for energy generation.

Here, the resilient element can comprise a spring construction or it can be formed as a gaseous buffer. For this purpose, embodiments exist in which the second fluid reservoir is designed as a closed (gas-tight) container wherein the gas or air cushion located above the fluid level is used as a gaseous buffer, and which can thus be implemented in a simple manner.

To minimize the hydraulic losses, the turbine/pump arrangement is preferably arranged in an opening in the bottom area of the second fluid reservoir. Opening here denotes a communicating connection between the first and the second fluid reservoir, which, for the operation of the turbine/pump arrangement, comprises the needed guides, lines, chambers or the like.

For operation in an electrical power grid, embodiments exist wherein the turbine/pump arrangement can be coupled to an electrical machine, to an electrical motor during pump operation and to a generator during turbine operation. The electrical machine can be connected here to an electrical load and/or to an electrical power source.

Claim 11 relates to a large store installation with a hydraulic energy store according to the invention, wherein the first fluid reservoir is a water body, in particular an ocean, a sea, or an artificial lake.

Embodiment examples of the present invention are explained in further detail below in reference to the diagrammatic representations.

Figure 1:
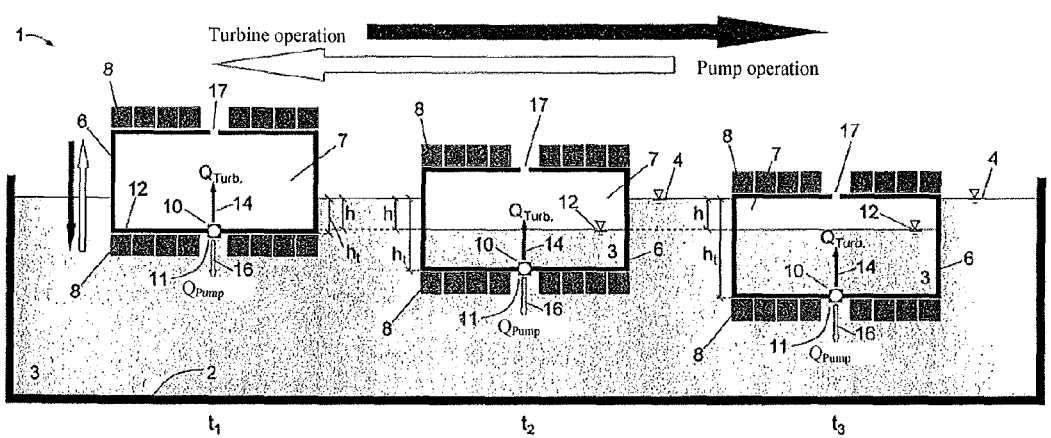
FIG. 1 shows a first embodiment example of a hydraulic store according to the invention having a second fluid reservoir whose fluid level is below the fluid level in the first fluid reservoir and which is shown in three different operating states.

Next, embodiment examples of the invention are explained in reference to FIGS. 1-6, in each of which a second fluid reservoir is represented in three different operating stages $t_1$, $t_2$ and $t_3$.

Before discussing the embodiment examples in detail, a few basic explanations are provided regarding the invention:

Hydraulic energy stores, during turbine operation, convert potential energy to electrical energy by means of turbines and generators, and, during pump operation, they convert the electrical energy available for energy storage to potential energy by means of motors and pumps.

Variants exist, which are characterized in that the fluid level in the second fluid reservoir is located below the fluid level of the first fluid reservoir (see FIG. 1, for example). During turbine operation (energy generation), fluid flows due to the level/pressure difference from the first reservoir into the second reservoir. As a result, the total weight of the second reservoir increases steadily by the amount of inflowing fluid. In compensation for the stable equilibrium of the floating second reservoir, the buoyancy (which corresponds to the weight of the displaced fluid) is increased to the same extent by lowering the second reservoir. During pump operation (energy storage), on the other hand, fluid is conveyed from the second fluid reservoir into the first fluid reservoir against the level/pressure difference. As a result, the total weight of the second reservoir steadily decreases by the amount of outflowing fluid. Accordingly, less buoyancy is required to maintain the stable equilibrium of the floating second reservoir. The decrease in buoyancy is achieved by raising the second reservoir.

Other variants are characterized in that the fluid level in the first fluid reservoir is below the fluid level of the second fluid reservoir (see FIG. 4, for example). During turbine operation (energy generation), fluid flows due to the level/pressure difference from the second reservoir into the first reservoir. As a result, the total weight of the second reservoir decreases steadily by the amount of outflowing fluid. In compensation for the stable equilibrium of the floating second reservoir, the buoyancy is decreased to the same extent by raising the second reservoir.

During pump operation (energy storage), fluid is conveyed from the first fluid reservoir into the second fluid reservoir against the level/pressure difference. As a result, the total weight of the second reservoir increases steadily by the amount of inflowing fluid. Accordingly, greater buoyancy is required to maintain the stable equilibrium of the floating second reservoir. The increase in buoyancy is achieved by lowering the second reservoir.

Embodiments of the hydraulic energy store without resilient elements in the form of straight generic cylinders have the advantage that the level difference that can be used for energy conversion remains constant. Consequently, particularly the machines provided at the turbine/pump arrangement (turbines, pumps, generators, and motors) can be designed to be simpler and for an optimal operating point.

Owing to the design, the losses that occur during energy storage or energy conversion are very low, and outside of the machines they are limited substantially to the hydraulic losses at the inlets and the outlets of the turbine/pump arrangement.

Standard pumps work with a specific output, i.e., the energy consumption and the fluid flow are constant at the optimal operating point. Standard turbines, on the other hand, can be adapted to the desired output by regulating the fluid flow. Due to the simultaneous operation of the turbine and the pump, a portion of the water can be circulated in a loop (hydraulic short circuit). Using a skillful arrangement and operating procedure of the turbine/pump arrangement, a steplessly variable energy delivery or energy uptake thus becomes possible with, at all times, optimal efficiency adapted precisely at all times to the output required in the power grid (regulation and compensation energy). In addition, changes in the operating state from pump mode to turbine mode and vice versa (special applications with rapid load change) can be carried out very rapidly.

Owing to the design, the full capacity for output uptake and delivery can be ensured in a very short time period. Thus, for example, energy can be provided to stabilize the power grid against output and removal fluctuations (regulation energy).

Due to the fact that the number of cycles is unlimited owing to the design, and since the high efficiency remains constant, considerable advantages are expected during operation in comparison to similar energy storage systems. Hydraulic energy stores, due to their operational readiness, are ideal completion partners for the increasingly high-volatility wind-energy and photovoltaic upgrading.

The energy from offshore wind energy and photovoltaic parks, for example, can be stored directly at the site of generation or at the site of consumption (for example, in cities close to the coast), and delivered to the consumers as needed. Alternative energy storage concepts (for example, the use of pump storage capacities in central Europe), on the other hand, often require an increase in the transmission output by a cost intensive upgrading of the transmission and distribution network.

The need for offshore energy, aquaculture and transport infrastructure (offshore terminals, maritime service platforms) will increase in the near future. Soon offshore wind parks will cover large areas in the North Sea and the Baltic Sea, and they will assume a corresponding role in the context of European energy generation. In this regard, offshore platforms that can be used for multiple purposes will offer both economic and ecological advantages in the future. The principles of the hydraulic energy store can be integrated ideally in every design of multi-use offshore platforms. The combined use with variable structures is one of the strengths of the hydraulic energy store. Thus, for example, floating platforms are conceivable as residential, industrial and commercial surfaces for maritime city enlargements, floating intermediate storage for overseas containers, floating ocean current power plants and solar farms, etc., each with integrated energy storage.

The following applies to the embodiment examples represented in the figures:

FIG. 1 shows a first embodiment example of a hydraulic energy store 1, which comprises a first fluid reservoir 2, which is, for example, a natural water body, such as a sea, an artificial lake, an ocean, or a bay.

The first fluid reservoir, designed here as first water container 2, is filled with a fluid, here water 3, up to a first fluid or water level 4.

A second fluid reservoir, designed here as second water container 6, is arranged so it floats in the water 3, which is optionally provided with additional loads 8. In the bottom of the second water container 6, in an opening 11, a turbine pump arrangement 10 is provided, by means of which the water 3 can be exchanged between the first water container 2 and the second water container 6. The turbine/pump arrangement 10 is coupled to an electrical machine (generator and/or motor), which in turn is connected via a power grid to power sources (for example, wind turbines) or power consumers.

At time $t_1$, the second water container 6 floats with an immersion depth $h_t$ in the first water container 2. The level difference h between the first water level 4 in the first water container 2 and the second water level 12 in the second water container 6 is caused here by the mass and the buoyancy of the second water container 6, and it can be influenced via the additional loads (ballast) 8.

To convert the potential energy stored in the second water container 6 to kinetic energy and subsequently to electrical energy, water 3 flows through the turbine/pump arrangement 10 as a volume stream $Q_{Turb.}$ in arrow direction 14 into the inner space 7 of the second water container 6. The latter fills increasingly with water 3, and the second water container 6 sinks increasingly in the first water container 2 (state $t_2$ and $t_3$). Here, the usable level difference h between the second water level 12 and the first water level 4 remains constant, so that the turbine/pump arrangement 10 can be operated at constant pressure head and number of revolutions. The same applies to a connected electrical machine, here a generator. The convertible energy quantity depends on the volume of the water quantity that can be stored in the second water container 6 and on the efficiency of the turbine/pump arrangement 10 in connection with the electrical machines connected to said arrangement. At the time of the transition from the operating states $t_1$ to $t_3$, the installation works in turbine operation and energy is generated.

In order to convert electrical energy to potential energy, the process runs in the opposite direction (from $t_3$ to $t_1$). Here, a machine that is operated as an electrical motor is coupled to the turbine/pump arrangement 10. Said machine, during pump operation, conveys the water 3 located in the second water container 6, as a volume stream $Q_{Pump}$ in arrow direction 16, back into the first water container 2. Air entering through the ventilation 17 replaces the exiting water 3 and increases the buoyancy of the second water container 6, so that its immersion depth $h_t$ is decreased, while the level difference h that is usable for the energy conversion remains constant, so that, during pump operation as well, a constant motor output can be used at an optimized operating point.

By raising the second water container 6 in the first water container 2 (pump operation during the transition from $t_3$ to $t_1$), the electrical and kinetic energy is ultimately converted by the performance of elevating work to potential energy, which in turn can then be converted to electrical energy, during turbine operation, by lowering/flooding the second water container 6.

Figure 2:
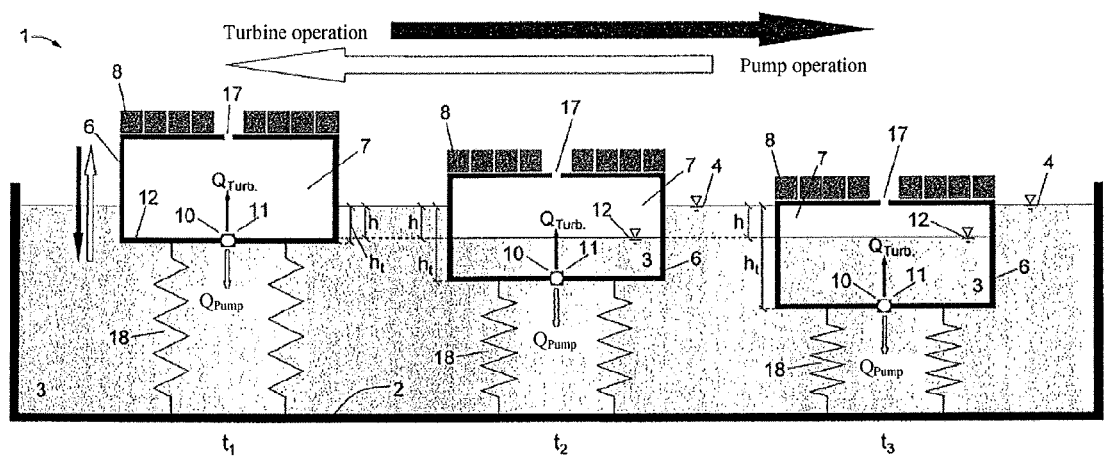
FIG. 2 shows the hydraulic energy store represented in FIG. 1, wherein the immersion depth of the second fluid reservoir is increased via spring elements.
Figure 3:
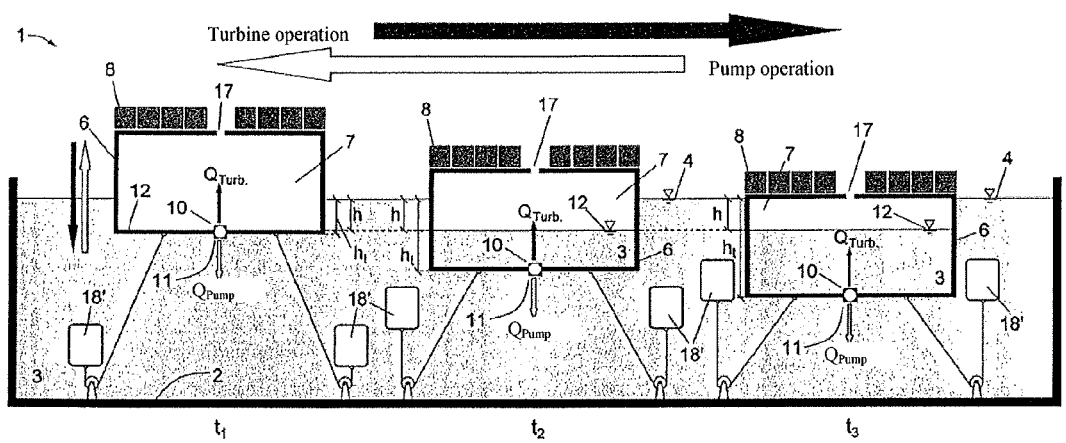
FIG. 3 shows the hydraulic energy store represented in FIG. 1, wherein the immersion depth of the second fluid reservoir is increased by a pulling device via buoyant bodies deflected at the bottom of the first fluid reservoir.

FIG. 2 shows a variant of the embodiment represented in FIG. 1. Here, a portion of the additional loads 8 is replaced by an electric pulling device 18, by means of which the immersion depth $h_t$ and thus also the usable level difference h can be increased. The pulling device 18 is represented by stylized springs in FIG. 2. In other embodiments (see FIG. 3), such a pulling device can also be implemented via buoyant bodies 18' deflected at the bottom of the first fluid reservoir 2. Pulling devices, in addition, have the positive property of preventing lateral deflections of the second water container 6, thus stabilizing the horizontal position.

Figure 4:
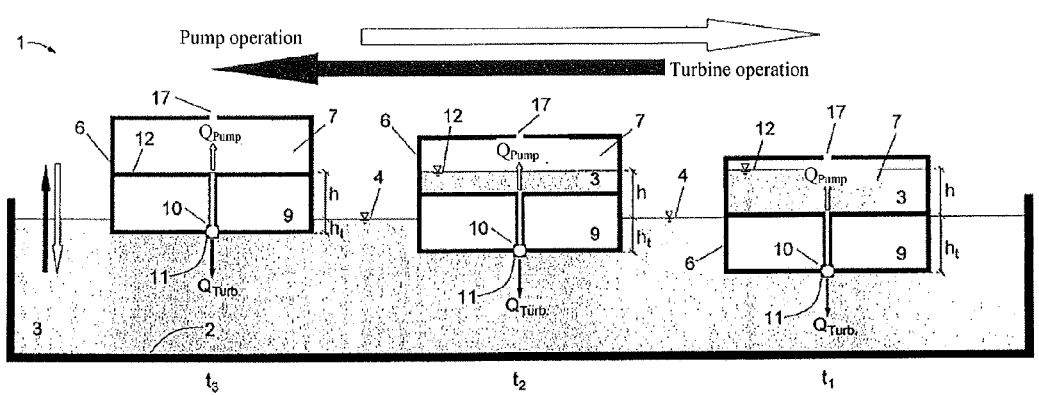
FIG. 4 shows a second embodiment example of a hydraulic energy store according to the invention, in which the buoyancy of the second fluid reservoir is set in such a way that its fluid level is above the fluid level in the first fluid reservoir.
Figure 5:
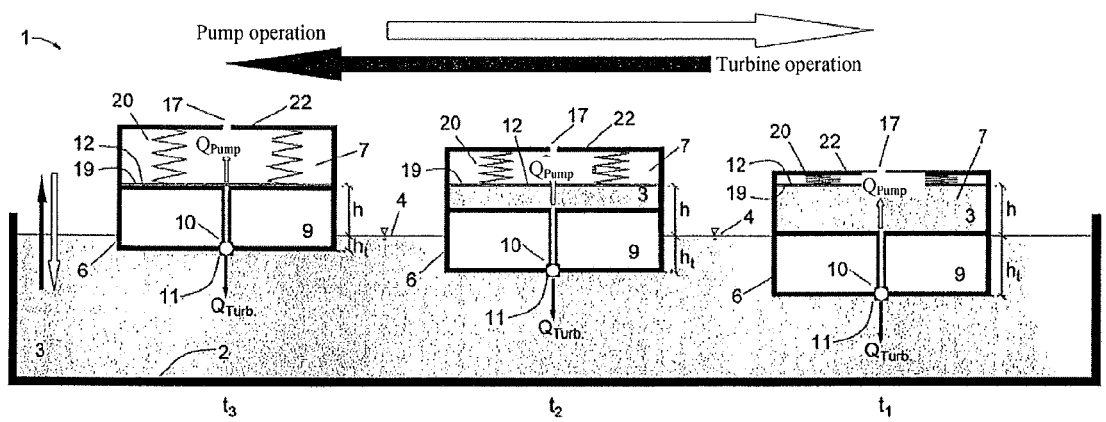
FIG. 5 shows the hydraulic energy store represented in FIG. 4, wherein the energy storage capacity is increased by a spring arrangement.
Figure 6:
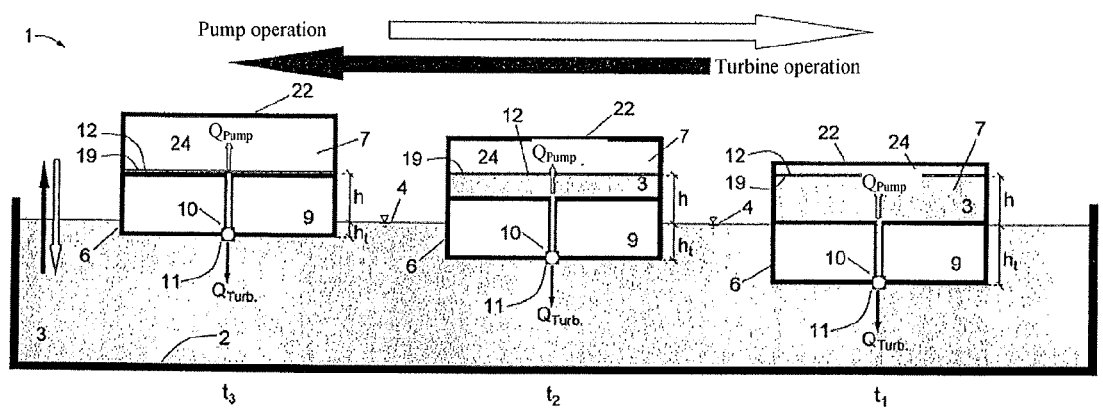
FIG. 6 shows a variant of the hydraulic energy store represented in FIG. 4, in which the second fluid reservoir is designed as a closed container.

FIGS. 4-6 show additional embodiment examples, in which the first water level 4 in the first water container 2 is below the second water level 12 in the second water container 6. Here, the energy conversion runs in the opposite direction. For this purpose, the second water container 6 is provided with buoyant bodies 9, which lift the bottom of the second water container 6 by the level difference h above the first water level 4.

For energy storage ($t_3$ to $t_1$), that is for converting electrical energy into potential energy, the turbine/pump arrangement 10 is used during pump operation for conveying the water 3 into the inner space 7 of the second water container 6. In the process, the latter is filled and it pushes the buoyant body 9 increasingly deeper into the water 3 in the first water container 2. The second water container 6 sinks. Here too, the usable level difference h can be kept constant during pump operation.

The energy generation runs in the opposite direction ($t_1$ to $t_3$). Due to the level difference h between the first water level 4 and second water level 12, the water 3 located in the second water container 6 is pushed out of the second water container, and in the process—during turbine operation—it drives the turbine/pump arrangement 10, which converts the kinetic energy via an electrical machine (generator) to electrical energy. In the process, the second water container 6 is emptied and it rises upward in the water 3 of the first water container 2.

FIG. 5 shows an embodiment in which the energy storage capacity is increased by an additional resilient element. For this purpose, for example, in the second water container 6, a sealing plate 19 corresponding to the base surface area is provided, which is placed on the second water level 12, and which is braced by means of a compression spring arrangement 20 against the cover 22 of the second water container 6. When water 3 is pumped into the second water container 6, on the one hand, potential energy is stored by pumping the water 3 upward by the usable level difference h, and, on the other hand, tension energy is stored, in addition, by deforming the resilient springs 20.

FIG. 6 shows an embodiment in which this principle is implemented by means of a gas buffer 24 located above the water level 12. The second water level 6 is designed as a closed container, and the water 3, which enters the second water container 6 during pump operation, additionally compresses the gas buffer 24, which is designed here as an air buffer. As a result, the energy storage capacity is increased in this embodiment as well.

Additional variants and embodiments arise for the person skilled in the art within the scope of the claims.

The invention claimed is:

1. A hydraulic energy store comprising a first fluid reservoir containing a first fluid having a first fluid level and a second fluid reservoir containing a second fluid having a second fluid level, wherein the first and the second fluid levels are at different heights, and the first fluid reservoir and the second fluid reservoir are connected to one another via an arrangement provided in an opening in the bottom of the second fluid reservoir, the arrangement comprising a device selected from the group of: a turbine, a pump, and combinations thereof, wherein during the operation of the arrangement, the first fluid and the second fluid can be moved to and fro between the first fluid reservoir and the second fluid reservoir to convert energy, and further wherein the second fluid reservoir is configured as a container floating in the first fluid reservoir and is arranged at a changeable immersion depth within the first fluid in the first fluid reservoir, and the second fluid level is different from the first fluid level in the first fluid reservoir, such that during operation, the second fluid level is changed in such a way that the immersion depth of the second fluid reservoir in the first fluid reservoir is changed to convert energy defined by a level difference between the first fluid level and the second fluid level.

2. The hydraulic energy store according to claim 1, wherein the second fluid level of the second fluid reservoir is below the first fluid level of the first fluid reservoir.

3. The hydraulic energy store according to claim 1, wherein the second fluid reservoir is provided with ballast, in order to increase the immersion depth and the difference between the first fluid level of the first fluid reservoir and the second fluid level of the second fluid reservoir.

4. The hydraulic energy store according to claim 1, wherein the immersion depth and the difference between the first fluid level of the first fluid reservoir and the second fluid level of the second fluid reservoir are increased via a pulling device.

5. The hydraulic energy store according to claim 1 wherein the second fluid reservoir is provided with one or more buoyant bodies, in such a way that the second fluid level of the second fluid reservoir is above the first fluid level of the first fluid reservoir.

6. The hydraulic energy store according to claim 1, wherein during filling of the second fluid reservoir the second fluid deforms a resilient element against a tension force.

7. The hydraulic energy store according to claim 6, wherein the resilient element is selected from the group of: a spring construction, a resilient element formed as a gaseous buffer, and combinations thereof.

8. The hydraulic energy store according to claim 7, wherein the gaseous buffer is formed as an air cushion arranged above the second fluid level of the second fluid reservoir, and the second fluid reservoir is formed as a closed container.

9. The hydraulic energy store according to claim 1, wherein the arrangement comprises a pump and the arrangement is coupled to an electrical machine which can be used as an electrical motor during operation of the pump.

10. The hydraulic energy store according to claim 9, wherein the hydraulic energy store is connected via a power grid to a power source.

11. The hydraulic energy store according to claim 1, wherein the hydraulic energy store is configured to supply energy to power consumers.

12. The hydraulic energy store according to claim 1, wherein the arrangement comprises a turbine and the arrangement is coupled to an electrical machine which can be used as a generator during operation of the turbine.

13. The hydraulic energy store according to claim 12, wherein the hydraulic energy store is connected via a power grid to a power source.

14. The hydraulic energy store according to claim 12, wherein the hydraulic energy store is configured to supply energy to power consumers.

15. The hydraulic energy store according to claim 1, wherein the first fluid reservoir is a water body selected from the group of: an ocean, a sea, a lake, an artificial lake.

16. An energy storage installation comprising a hydraulic energy store having a first fluid reservoir containing a first fluid having a first fluid level and a second fluid reservoir containing a second fluid having a second fluid level, wherein the first and the second fluid levels are at different heights, and the first fluid reservoir and the second fluid reservoir are connected to one another via an arrangement provided in an opening in the bottom of the second fluid reservoir, the arrangement comprising a device selected from the group of: a turbine, a pump, and combinations thereof, wherein during the operation of the arrangement the first fluid and the second fluid can be moved to and fro between the first fluid reservoir and the second fluid reservoir to convert energy, and wherein the second fluid reservoir is configured as a container floating in the first fluid reservoir and is arranged at a changeable immersion depth within the first fluid in the first fluid reservoir, and the second fluid level in the second fluid reservoir is different from the first fluid level in the first fluid reservoir, such that during operation, the second fluid level is changed in such a way that the immersion depth of the second fluid reservoir in the first fluid reservoir is changed to convert energy defined by a level difference between the first fluid level and the second fluid level, and further wherein the first fluid reservoir is a body of water selected from the group of: an ocean, a sea, a lake, an artificial lake, and combinations thereof, and further wherein the second fluid reservoir is provided with ballast, in order to increase the immersion depth and the difference between the first fluid level of the first fluid reservoir and the second fluid level of the second fluid reservoir.

* * * * *